(12) United States Patent
Yamamoto et al.

(10) Patent No.: US 7,128,977 B2
(45) Date of Patent: Oct. 31, 2006

(54) SILICONE COATING COMPOSITION AND RELEASE SHEET

(75) Inventors: Kenji Yamamoto, Usui-gun (JP); Masahiko Ogawa, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 67 days.

(21) Appl. No.: 10/626,669

(22) Filed: Jul. 25, 2003

(65) Prior Publication Data

US 2004/0127636 A1  Jul. 1, 2004

(30) Foreign Application Priority Data

Jul. 25, 2002  (JP)  .............. 2002-216676

(51) Int. Cl.
*B32B 9/04*  (2006.01)

(52) U.S. Cl. .............. 428/447; 524/268; 525/477; 525/478; 525/479; 528/15; 528/31; 528/32; 428/405; 428/451; 428/452

(58) Field of Classification Search .......... 528/15, 528/17, 18, 31, 32; 524/266, 268; 428/447, 428/452

See application file for complete search history.

(56) References Cited

U.S. PATENT DOCUMENTS

| | | | |
|---|---|---|---|
| 4,320,172 A | | 3/1982 | Takamizawa et al. |
| 4,918,131 A | | 4/1990 | Gamon et al. |
| 5,521,245 A | * | 5/1996 | Hirabayashi et al. ....... 524/493 |
| 5,582,885 A | | 12/1996 | Nakamura et al. |
| 6,017,587 A | * | 1/2000 | Kleyer et al. .............. 427/387 |
| 6,838,499 B1 | * | 1/2005 | Kimura ..................... 524/268 |

FOREIGN PATENT DOCUMENTS

| | | | |
|---|---|---|---|
| EP | 0 365 009 A2 | | 4/1990 |
| EP | 0 471 589 B1 | | 11/1995 |
| EP | 0 903 385 B1 | | 12/2001 |
| EP | 1 205 595 A2 | | 5/2002 |
| JP | 56-10548 A | | 2/1981 |
| JP | 56-11980 A | | 2/1981 |
| JP | 56-14550 A | | 2/1981 |
| JP | 56-14556 A | | 2/1981 |
| JP | 60-158249 A | | 8/1985 |
| JP | 2003055553 A | * | 2/2003 |
| WO | WO 89/12549 | | 12/1989 |

* cited by examiner

*Primary Examiner*—Marc S. Zimmer
(74) *Attorney, Agent, or Firm*—Birch, Stewart, Kolasch & Birch, LLP

(57) ABSTRACT

The addition of silicone rubber fine particles to a composition comprising an organopolysiloxane having at least two alkenyl groups, an organohydrogenpolysiloxane having at least three SiH groups and a catalyst yields a composition which when coated onto any substrate, forms a coating whose surface is extremely reduced in gloss and highly uniform. Using the coating of the composition as a release sheet, synthetic resin sheets having matte surfaces can be readily manufactured.

8 Claims, No Drawings

SILICONE COATING COMPOSITION AND RELEASE SHEET

BACKGROUND OF THE INVENTION

1. Technical Field

This invention relates to silicone coating compositions suitable for the manufacture of synthetic resin sheets, and release sheets.

2. Background Art

It is well known from the past to produce materials having release properties to adhesive substances, typically pressure-sensitive adhesives, by forming releasable cured coats on the surface of various substrates such as paper, synthetic resin films and synthetic fiber fabrics. In one application, such releasable cured coats are employed in the manufacture of synthetic resin sheets.

In the prior art, various substrates laminated with polypropylene resins or coated with aminoalkyd resins are known to use in the application for the manufacture of synthetic resin sheets (see JP-A 56-10548, 56-11980, 56-14550 and 56-14556). They are satisfactory for the so-called mirror finish where the synthetic resin surface develops a high gloss, but unsatisfactory for the so-called matte finish where gloss is controlled. The coatings of polypropylene resins are durable, but less resistant to heat. The aminoalkyd resins are good in heat resistance and gloss control, but have poor stability as the treating agent, deficiencies in coating surface evenness and low yields. They are thus industrially unsatisfactory. See JP-A 60-158249.

SUMMARY OF THE INVENTION

An object of the invention is to provide silicone coating compositions suitable for the manufacture of synthetic resin sheets, and release sheets.

It has been found that the addition of silicone rubber fine particles to a conventional silicone composition for forming release paper yields a composition which when coated onto any substrate, forms a coating whose surface gloss is extremely reduced, that is, whose surface becomes matte or free of gloss and highly uniform. Using the coating of the composition, synthetic resin sheets having a matte finish can be readily manufactured.

In one embodiment, the invention provides a silicone coating composition comprising as essential components, (A-1) 100 parts by weight of an organopolysiloxane having at least two alkenyl groups each directly attached to a silicon atom in a molecule, represented by the average compositional formula (i):

$$R^1_a R^2_b SiO_{(4-a-b)/2} \quad (i)$$

wherein $R^1$ is independently a substituted or unsubstituted monovalent hydrocarbon group exclusive of alkenyl groups, $R^2$ is an alkenyl group, a and b are numbers: $0 \leq a \leq 3$, $0 < b \leq 3$ and $1 \leq a+b \leq 3$, (B-1) an organohydrogenpolysiloxane having at least three hydrogen atoms each directly attached to a silicon atom (i.e., SiH groups) in a molecule, represented by the average compositional formula (ii):

$$R^1_c H_d SiO_{(4-c-d)/2} \quad (ii)$$

wherein $R^1$ is as defined above, c end d are numbers: $0 \leq c \leq 3$, $0 < d \leq 3$ and $1 \leq c+d \leq 3$, in such an amount that the moles of silicon-bonded hydrogen atoms is 1 to 5 times the moles of alkenyl groups in component (A-1), (C) 5 to 150 parts by weight of a silicone rubber fine powder having an average particle size of 0.5 to 20 μm, (D-1) a catalytic amount of an addition reaction catalyst, and optionally, (E) a suitable amount of an organic solvent.

In another embodiment, the invention provides a silicone coating composition comprising as essential components, (A-2) 100 parts by weight of an organopolysiloxane having at least two silanol groups in a molecule, represented by the average compositional formula (iii);

$$R^1_e(OH)_f SiO_{(4-e-f)/2} \quad (iii)$$

wherein $R^1$ is independently a substituted or unsubstituted monovalent hydrocarbon group exclusive of alkenyl group, e and f are numbers: $0 \leq e \leq 3$, $0 < f \leq 3$ and $1 \leq e+f \leq 3$, (B-2) an organohydrogenpolysiloxane having at least three hydrogen atoms each directly attached to a silicon atom (i.e., SiH groups) in a molecule, represented by the average compositional formula (ii):

$$R^1_c H_d SiO_{(4-c-d)/2} \quad (ii)$$

wherein $R^1$ is as defined above, c and d are numbers: $0 \leq c \leq 3$, $0 < d \leq 3$ and $1 \leq c+d \leq 3$, in such an amount that the moles of silicon-bonded hydrogen atoms is 5 to 200 times the moles of silanol groups in component (A-2), or an organopolysiloxane having at least three hydrolyzable groups each directly attached to a silicon atom in a molecule, represented by the average compositional formula (iv):

$$R^1_g R^3_h SiO_{(4-g-h)/2} \quad (iv)$$

wherein $R^1$ is as defined above, $R^3$ is a hydrolyzable group, g and h are numbers: $0 \leq g \leq 3$, $0 < h \leq 3$ and $1 \leq g+h \leq 3$, in such an amount that the moles of hydrolyzable groups is 5 to 200 times the moles of silanol groups in component (A-2), (C) 5 to 150 parts by weight of a silicone rubber fine powder having an average particle size of 0.5 to 20 μm, (D-2) a catalytic amount of a condensation reaction catalyst, and optionally, (E) a suitable amount of an organic solvent.

A release sheet comprising a cured coating of the silicone composition defined above is also provided.

DETAILED DESCRIPTION OF THE INVENTION

Component (A-1) in the silicone coating composition of the invention is an organopolysiloxane having at least two alkenyl groups each directly attached to a silicon atom in a molecule, represented by the average compositional formula (i):

$$R^1_a R^2_b SiO_{(4-a-b)/2} \quad (i)$$

wherein $R^1$ is independently a substituted or unsubstituted monovalent hydrocarbon group exclusive of alkenyl groups, $R^2$ is an alkenyl group, a and b are numbers: $0 \leq a \leq 3$, $0 < b \leq 3$ and $1 \leq a+b \leq 3$.

More particularly, $R^2$ may be the same or different and is selected from among substituted or unsubstituted monovalent hydrocarbon groups exclusive of alkenyl groups, preferably having 1 to 12 carbon atoms, more preferably 1 to 10 carbon atoms. Illustrative examples include hydrocarbon groups, for example, alkyl groups such as methyl, ethyl, propyl and butyl, cycloalkyl groups such as cyclopentyl and cyclohexyl, aryl groups such as phenyl and naphthyl, and aralkyl groups such as benzyl and phenylethyl. It is preferred in the invention that at least 80 mol % of $R^1$ be methyl. The alkenyl groups represented by $R^2$ are preferably of 2 to 8 carbon atoms, for example, vinyl, allyl, butenyl, pentenyl, hexenyl, and heptenyl, with vinyl being preferred from the industrial aspect.

The organopolysiloxane (A-1) has at least two, preferably at least three, alkenyl groups each directly attached to a silicon atom in a molecule. The alkenyl groups may be attached at ends of or midway the molecular chain.

The subscripts a and b are numbers: $0 \leq a \leq 3$, $0 < b \leq 3$ and $1 \leq a+b \leq 3$, preferably $0.5 \leq a \leq 2.5$, $0.0002 \leq b \leq 1$ and $1.5 \leq a+b \leq 2.5$.

Component (A-2) is an organopolysiloxane having at least two silanol groups in a molecule, represented by the average compositional formula (iii):

wherein $R^1$ is independently a substituted or unsubstituted monovalent hydrocarbon group exclusive of alkenyl group as mentioned above, e and f are numbers: $0 \leq e \leq 3$, $0 < f \leq 3$ and $1 \leq e+f \leq 3$.

The organopolysiloxane (A-2) should have at least two silanol groups in a molecule. The subscripts e and f are numbers; $0 \leq e \leq 3$, $0 < f \leq 3$ and $1 \leq e+f \leq 3$, preferably $1.0 \leq e \leq 2.5$, $0.0001 \leq f \leq 0.5$ and $1.5 \leq e+f \leq 2.5$.

For both (A-1) and (A-2), no particular limit is imposed on the molecular structure of the organopolysiloxane. It may have a straight or branched chain structure and its viscosity at 25° C. is preferably at least 100 mPa·s, more preferably at least 0.200 mPa·s. It may be gum-like.

Illustrative examples of components (A-1) and (A-2) include organopolysiloxanes of the following structural formulae wherein m is a number of 0 to 1,000, n is a number of 10 to 9,000, and Me is methyl.

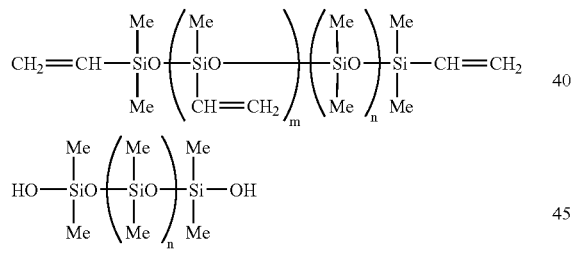

Component (B-1) is an organohydrogenpolysiloxane having at least three hydrogen atoms each directly attached to a silicon atom (i.e., SiH groups) in a molecule, represented by the average compositional formula (ii):

wherein $R^1$ is as defined above, c and d are numbers: $0 \leq c \leq 3$, $0 < d \leq 3$ and $1 \leq c+d \leq 3$.

$R^1$ is as defined in formula (i), c and d are numbers: $0 \leq c \leq 3$, $0 < d \leq 3$ and $1 \leq c+d \leq 3$, preferably $0.5 \leq c < 2.4$, $0.1 \leq d \leq 1.0$ and $1.5 \leq c+d \leq 2.5$.

The organohydrogenpolysiloxane used herein should have at least three hydrogen atoms each directly attached to a silicon atom (i.e., SiH groups) in a molecule, preferably 3 to 100 SiH groups. Its molecular structure may be straight, branched or cyclic, and its viscosity at 25° C. may be in a range of several mPa·s to several ten thousand mPa·s.

Illustrative examples of suitable organohydrogenpolysiloxane are given below.

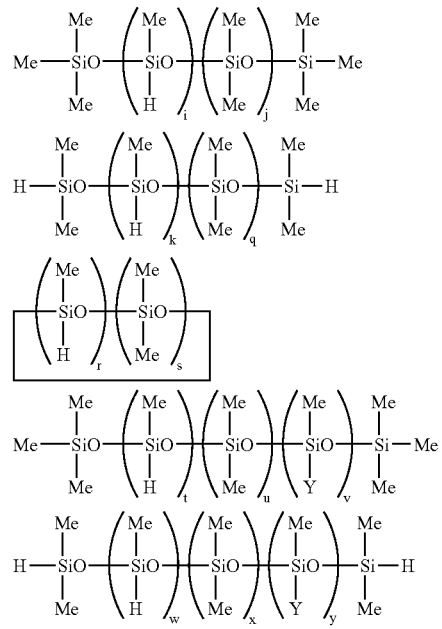

In the above compositional formulae, Me is methyl, Y is a group of the following structural formula:

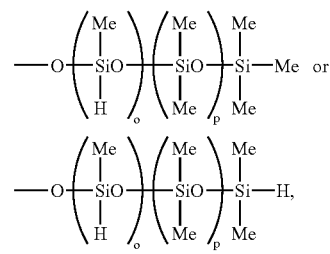

i, r and t each are an integer of 3 to 500, k, w, v and y each are an integer of 1 to 500, j, q, s, u, x, o and p each are an integer of 0 to 500.

Component (B-1) is used in such an amount that the moles of silicon-bonded hydrogen atoms is 1 to 5 times the moles of alkenyl groups in component (A-1), and preferably 1.5 to 4.5 times the moles of alkenyl groups in component (A-1). If the ratio of the moles of silicon-bonded hydrogen atoms to the moles of alkenyl groups in component (A-1) is less than 1, the silicone coating composition becomes less curable. A ratio of more than 5 achieves no significant enhancement of the desired effect, rather causes a noticeable change with time and is economically disadvantageous.

Component (B-2) is an organohydrogenpolysiloxane represented by the average compositional formula (ii) defined above or an organopolysiloxane having at least three hydrolyzable groups each directly attached to a silicon atom in a molecule, represented by the average compositional formula (iv):

wherein $R^1$ is as defined above, $R^3$ is a hydrolyzable group, g and h are numbers: $0 \leq g \leq 3$, $0 < h \leq 3$ and $1 \leq g+h \leq 3$.

$R^3$ is a hydrolyzable group. Suitable hydrolyzable groups include alkoxy groups such as methoxy, ethoxy, propoxy, butoxy, methoxyethoxy, and isopropenoxy, acyloxy groups such as acetoxy, amino groups such as ethylamino, amide groups, oxime groups such as ethylmethylbutanoxime, and halogen atoms such as chlorine and bromine, each directly attached to a silicon atom. Of these, methoxy is most preferred.

The subscripts g and h are numbers: $0 \leq g \leq 3$, $0 < h \leq 3$ and $1 \leq g+h \leq 3$, preferably $0 \leq g \leq 2$, $0.1 \leq h \leq 3$ and $1.5 \leq g+h \leq 3.0$.

Examples of the organopolysiloxane having at least three hydrolyzable groups each directly attached to a silicon atom in a molecule, represented by the average compositional formula (iv) are given below.

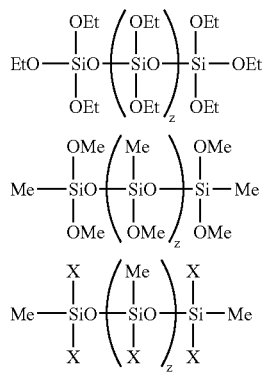

It is noted that in the above structural formulae, z is an integer of 0 to 500, Me is methyl, Et is ethyl, and X is selected from the following groups.

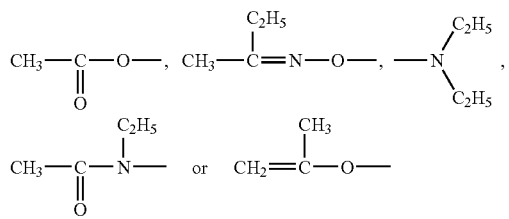

Component (B-2) is used in such an amount that the moles of silicon-bonded hydrogen atoms in organohydrogenpolysiloxane (ii) and hydrolyzable groups in organopolysiloxane (iv) is 5 to 200 times, preferably 10 to 100 times, the moles of silanol groups in component (A-2). If the ratio of the total moles of hydrogen atoms and hydrolyzable groups to the moles of silanol groups in component (A-2) is less than 5, the silicone coating composition becomes less curable. A ratio of more than 200 achieves no significant enhancement of the desired effect, rather causes a noticeable change with time and is economically disadvantageous.

Usually, component (B) is used in an amount of 0.1 to 20 parts by weight per 100 parts by weight of the organopolysiloxane (A). With less than 0.1 part by weight of component (B), the silicone composition may become less curable. More than 20 parts by weight of component (B) may achieve no significant enhancement of the desired effect.

Component (C) is a silicone rubber fine powder (or particles) having an average particle size of 0.5 to 20 μm, which is a characteristic component of the invention. It is obtainable by pulverizing silicone rubber in a pulverizer such as a jet mill. The silicone rubber used herein is preferably prepared by emulsifying and crosslinking an addition type silicone composition, for example, by agitating 100 parts by weight of an organopolysiloxane of the above formula (i) and 0.1 to 20 parts by weight of an organohydrogenpolysiloxane of the above formula (ii) in a homomixer, adding water to the mixture for emulsification, and adding an addition reaction catalyst, followed by curing.

The fine powder has an average particle size of 0.5 to 20 μm, preferably 1 to 15 μm. An average particle size of less than 0.5 μm sometimes fails to exert the addition effect whereas an average particle size of more than 20 μm can adversely affect the surface state at certain coating weights. The shape of fine particles is not critical, and irregular shape particles resulting from comminution of silicone rubber are acceptable.

Also a silicone rubber fine powder surface coated with an organosilsesquioxane as proposed, for example, in JP-A 7-196815 is advantageously used. On account of improved solvent resistance, the coated fine particles are effective when the solvent used for the preparation of synthetic resin sheets has a high dissolving power. Any well-known technique may be used in surface coating with an organosilsesquioxane. For example, an alkaline substance or alkaline aqueous solution and an organotrialkoxysilane are added to an aqueous dispersion of silicone rubber fine particles whereupon the organotrialkoxysilane is hydrolyzed and polycondensed for coating the particles with the resulting organosilsesquioxane.

Component (C) is used in an amount of 5 to 150 parts by weight per 100 parts by weight of component (A). Less than 5 parts by weight is too small to exert the addition effect whereas more than 150 parts by weight adversely affects adhesion to substrates. The silicone rubber fine powder is, of course, heat resistant, and is also effectively dispersible in the main components (A) and (B). As a consequence, even when a large amount is blended into the composition, the silicone rubber fine particles can be readily dispersed uniformly, and the dispersed state changes little with the passage of time, that is, remains stable, offering an esthetic coating surface. The cured coating is durable since the silicone rubber fine particles are tightly incorporated therein.

Component (D-1) is an addition reaction catalyst, and component (D-2) is a condensation reaction catalyst. The catalyst is used to promote the crosslinking reaction between components (A) and (B) to form a cured coating. Examples of the addition reaction catalyst (D-1) is typically platinum series metal type catalyst and includes platinum metal, platinum compounds such as platinum black, chloroplatinic acid, chloroplatinic acid-olefin complexes, chloroplatinic acid-alcohol coordinate compounds, rhodium, rhodium-olefin complexes, etc. The addition reaction catalyst (D-1) is used in a catalytic amount, such as to give 5 to 1000 ppm of platinum or rhodium based on the total weight of organopolysiloxane (A-1) and organohydrogenpolysiloxane (B-1) for forming a fully cured coating although the amount may be properly varied depending on the reactivity of the respective components and the desired curing rate.

Examples of the condensation reaction catalyst (D-2) include acids such as hydrochloric acid, phosphoric acid, methanesulfonic acid, p-toluenesulfonic acid, maleic acid, and trifluoroacetic acid; alkalis such as sodium hydroxide, potassium hydroxide, sodium ethoxide, and tetraethylammonium hydroxide; salts such as ammonium chloride, ammonium acetate, ammonium fluoride, and sodium carbonate; and organometallic compounds such as organic acid salts, alkoxides and chelates of metals including magnesium, aluminum, tin, zinc, iron, cobalt, nickel, zirconium, cerium and titanium, such as dioctyltin diacetate, zinc dioctate, titanium tetraisopropoxide, aluminum tributoxide, and zirconium tetraacetylacetonate. The condensation reaction catalyst is used in a catalytic amount, usually 1 to 10 parts by weight per 100 parts by weight of the organopolysiloxane (A-2) and the organohydrogenpolysiloxane or organopolysiloxane (B-2) combined.

An organic solvent may be used in the composition as component (E) for the purposes of improving the stability of a treating bath and the applicability of the composition to various substrates and adjusting the coating weight and the viscosity of the composition. Any organic solvent in which the composition is uniformly dissolved is useful, for example, toluene, xylene, ethyl acetate, acetone, methyl ethyl ketone, and hexane. The organic solvent may be omitted if unnecessary for a particular coating technique.

If necessary, any well-known additives such as pigments, leveling agents and bath life extending agents may be blended in the inventive composition as long as they do not compromise the objects of the invention.

The inventive composition is readily prepared by mixing the components (A) to (E) uniformly. In one advantageous mixing procedure, component (A) is uniformly dissolved in component (E) and components (B), (C) and (D) are then mixed therein. To insure a sufficient pot life, component (D) should preferably be added immediately before coating.

The composition is applied to substrates such as paper, is directly or after dilution with a suitable organic solvent, by any well-known coating technique using a bar coater, roll coater, reverse coater, gravure coater or air knife coater, or in the event of thin film coating, a high precision offset coater or multi-stage roll coater.

The coating weight of the inventive composition on a substrate is preferably 0.1 to 5.0 g/m$^2$ of solids although it varies with the type of material of the substrate to be coated. The substrate coated with the inventive composition is heated at 80 to 180° C. for 60 to 5 seconds to form a cured coating on the substrate surface, which is ready for use as a release sheet having appropriate properties for the preparation of desired synthetic resin sheets.

The substrate may be wood-free paper, clay coated paper, mirror coat paper, polyethylene (PE) laminate paper, glassine paper and kraft paper.

On the cured coating of the inventive composition on the substrate, a synthetic resin is formed as a sheet, after which the synthetic resin sheet is peeled away from the cured coating. In this way, synthetic resin sheets are manufactured. The synthetic resin may be a urethane resin, epoxy resin, vinyl chloride resin or the like.

EXAMPLE

Examples of the invention are given below by way of illustration and not by way of limitation.

Preparation Example 1 of Organopolysiloxane Rubber Fine Powder

In a beaker, 500 g of methylvinylsiloxane of formula (v) below and 20 g of methylhydrogenpolysiloxane of formula (vi) below were admitted and agitated by a homo-mixer at 2,000 rpm. Then 5 g of polyoxyethylene (addition moles=9 moles) octylphenyl ether and 150 g of water were added. Agitation was performed at 6,000 rpm, during which phase reversal took place and thickening was ascertained. Agitation was still continued at 2,000 rpm, while 325 g of water was added, obtaining an O/W type emulsion. With stirring at room temperature, a mixture of 1 g of a toluene solution of chloroplatinic acid-olefin complex (platinum content 0.05 wt %) and 1 g of polyoxyethylene (addition moles=9 moles) octylphenyl ether was added to the emulsion. Reaction was effected for 12 hours, yielding a water dispersion of organopolysiloxane rubber fine particles [1]. The cake-like matter resulting from filtration of the dispersion was dried at 105° C. and disintegrated in a jet mill, obtaining an organopolysiloxane rubber fine powder having an average particle size of 3 μm.

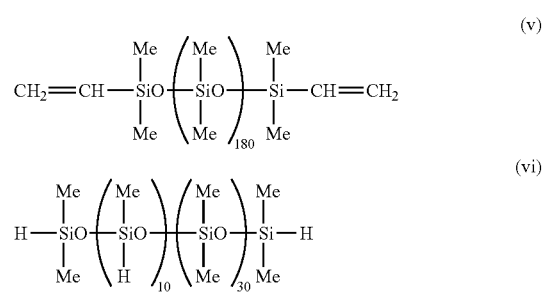

Preparation Example 2 of Organopolysiloxane Rubber Fine Powder

A flask was charged with 580 g of the water dispersion of organopolysiloxane rubber fine particles [1] obtained as an intermediate in the procedure of Preparation Example 1, 60 g of aqueous ammonia (concentration 28 wt %), and 2290 g of water. With stirring by rotating a blade at 200 rpm, 65 g of methyltrimethoxysilane was slowly added over 20 minutes at 10° C. The mixture was stirred for a further 4 hours at 5–15° C., then heated at 55–60° C. and stirred at the temperature for 1 hour. The cake-like matter resulting from filtration of the liquid was dried at 105° C. and disintegrated in a jet mill, obtaining an organosilsesquloxane-coated organopolysiloxane rubber fine powder having an average particle size of 3 μm.

Example 1

To 100 parts by weight of an organopolysiloxane (vinyl group content=0.02 mol/100 g) blocked with dimethylvinylsilyl groups at both ends of its molecular chain; having a main skeleton consisting of 1.5 mol % methylvinylsiloxane units and 98.5 mol % dimethylsiloxane units and exhibiting a viscosity of 5000 mPa·s in a 30 wt % toluene solution at 25° C. as component (A-1), was added 1800 parts by weight of toluene as component (E). The mixture was stirred at 20–40° C. for dissolution. To the solution were added 3 parts by weight of a methylhydrogenpolysiloxane (H content=1.5 mol/100 g) blocked with trimethylsilyl groups at both ends of its molecular chain, containing 95 mold of units MeHSiO$_{2/2}$, and having a viscosity of 25 mPa·s as component (B-1), 50 parts by weight of the organopolysiloxane rubber fine powder having an average particle size of 3 μm obtained in Preparation Example 1 as component (C), and 1 part by weight of 3-methyl-1-butyn-3-ol as a bath life extending agent. The contents were stirred and mixed at 20–40° C. for 1 hour.

Immediately before coating onto a substrate, a composition was prepared by adding a complex salt of platinum with vinylsiloxane as component (D-1) in an amount to give 100 ppm of platinum.

The composition was coated onto a PE laminate paper using a Mayer bar and cured under suitable conditions, obtaining a test sample having a coating weight of 1.0 g/m² as solids. The sample was examined by the tests of evaluating cured coating properties to be described later. The results are shown in Table 1.

Example 2

A composition was prepared as in Example 1 except that 150 parts by weight of the organosilsesquioxane-coated organopolysiloxane rubber fine powder having an average particle size of 3 μm obtained in Preparation Example 2 was used as component (C). A test sample was similarly prepared therefrom and examined by the tests. The results are shown in Table 1.

Example 3

To 100 parts by weight of an organopolysiloxane (degree of polymerization=6000, hydroxyl group content 0.0005 mol/100 g) blocked with dimethylhydroxysilyl groups at both ends of its molecular chain, having a main skeleton consisting of dimethylsiloxane units and exhibiting a viscosity of 5000 mPa·s in a 30 wt % toluene solution at 25° C. as component (A-2), was added 1800 parts by weight of toluene as component (E). The mixture was stirred at 20–40° C. for dissolution. To the solution were added 3 parts by weight of a methylhydrogenpolysiloxane (H content=1.5 mol/100 g) blocked with trimethylsilyl groups at both ends of its molecular chain, containing 95 mol % of units MeHSiO$_{2/2}$, and having a viscosity of 25 mPa·s as component (B-2), and 50 parts by weight of the organopolysiloxane rubber fine powder having an average particle size of 3 μm obtained in Preparation Example 1 as component (C), The contents were stirred and mixed at 20–40° C. for 1 hour.

Immediately before coating onto a substrate, a composition was prepared by adding 5 parts by weight of dioctyltin dioctate as component (D-2). A test sample was prepared therefrom and examined by the tests in the same manner as in Example 1. The results are shown in Table 1.

Comparative Example 1

A composition was prepared as in Example 1 except that 3 parts by weight of the organopolysiloxane rubber fine powder having an average particle size of 3 μm obtained in Preparation Example 1 was used as component (C). A test sample was similarly prepared therefrom and examined by the tests. The results are shown in Table 1.

Comparative Example 2

A composition was prepared as in Example 1 except that 200 parts by weight of the organopolysiloxane rubber fine powder having an average particle size of 3 μm obtained in Preparation Example 1 was used as component (C). A test sample was similarly prepared therefrom and examined by the tests. The results are shown in Table 1.

Comparative Example 3

A composition was prepared as in Example 1 except that 100 parts by weight of an organopolysiloxane rubber fine powder having an average particle size of 0.3 μm obtained by a procedure analogous to Preparation Example 1 was used as component (C). A test sample was similarly prepared therefrom and examined by the tests. The results are shown in Table 1.

Comparative Example 4

A composition was prepared as in Example 1 except that 100 parts by weight of an organopolysiloxane rubber fine powder having an average particle size of 30 μm obtained by a procedure analogous to Preparation Example 1 was used as component (C). A test sample was similarly prepared therefrom and examined by the tests. The results are shown in Table 1.

Comparative Example 5

A composition was prepared as in Example 1 except that 100 parts by weight of a silica fine powder having an average particle size of about 3 μm was used as component (C). A test sample was similarly prepared therefrom and examined by the tests. The results are shown in Table 1.

Comparative Example 6

A composition was prepared as in Example 1 except that 100 parts by weight of an acrylic resin fine powder having an average particle size of about 3 μm was used as component (C). A test sample was similarly prepared therefrom and examined by the tests. The results are shown in Table 1.

Evaluation of Cured Coating Properties

1) Curability

A silicone composition with a catalyst added was coated onto a PE-laminated wood-free paper (areal weight 100 g/m²) to a coating weight of 1.0 g/m² as solids and heat treated at 100° C. for 30 seconds in a hot-air circulating dryer to form a cured coating as a test sample.

After the surface of the cured coating was rubbed with the finger, the coating surface was observed for the degree of haze and stripping and rated according to the following criteria.

○: no haze or stripping after 100° C./30 seconds heat treatment
Δ: some haze or stripping
X: haze and stripping 2) Adhesion A silicone composition with a catalyst added was coated onto a PE-laminated wood-free paper (areal weight 100 g/m²) to a coating weight of 1.0 g/m² as solids and heat treated at 140° C. for 30 seconds in a hot-air circulating dryer to form a cured coating as a test sample.

After the sample was allowed to stand at 25° C. and 50% RH for one day, the surface of the cured coating was rubbed with the finger. The coating surface was observed for the degree of haze and stripping and rated according to the following criteria.

○: no haze or stripping
Δ: some haze or stripping
X: haze and stripping

3) Gloss

A test sample was prepared as in 2) Adhesion test. The gloss of the cured coating surface was measured by a gloss meter VG-2000 (Nippon Denshoku Co., Ltd.) at an incident angle of 60°. The target of reduced gloss is 5 or less.

4) Release Property

A test sample was prepared as in 2) Adhesion test. An acrylic solvent type pressure-sensitive adhesive (Oribain BPS-5127 by Toyo Ink Mfg. Co., Ltd.) was coated onto the cured coating surface and heat treated at 100° C. for 3 minutes. A wood-free paper (areal weight 64 g/m$^2$) was laid on the treated surface of the sample, over which a 2-kg roller was once moved back and forth for press bonding. The sample was then aged at 25° C. for 20 hours. The sample was cut into a strip of 5 cm wide. Using a tensile tester, the overlying paper was pulled at an angle of 180° and a peeling rate of 0.3 m/min. The force (N) required for peeling was measured. The tester used was autograph DCS-500 (Shimadzu Mgf. Co., Ltd.).

5) Durability

A test sample was prepared as in 4) Release test. The test cycle including application of pressure-sensitive adhesive, heat treatment, paper laying, aging and peeling (measurement) was repeated three times on the same test sample. Durability was evaluated in terms of a change of release property.

6) Synthetic Resin Sheet Formation

A test sample was prepared as in 2) Adhesion test. A one part type polyurethane solution Crisvon 5516S (Dainippon Ink & Chemicals, Inc.) was coated onto the cured coating surface and heat treated at 130° C. for 2 minutes to form a sheet of 30 μm thick. Then a pressure-sensitive adhesive tape Nitto 31B was applied to the treated surface of the sample, over which a 2-kg roller was once moved back and forth for press bonding. The sample was then aged at 25° C. for 20 hours. The sample was cut into a strip of 5 cm wide. Using a tensile tester, the overlying tape was pulled and peeled away at an angle of 180° and a peeling rate of 0.3 m/min. The gloss on the parting surface of the polyurethane sheet was measured. The sample was rated good "○" when the gloss was reduced to 5 or lower and poor "X" when the gloss exceeded 5. The sample was also rated poor "X" in the event a neat parting surface was not obtained, for example, part of the polyurethane resin was left on the surface of the test sample after peeling or difficulty arose in peeling due to poor release property.

7) Shelf Stability

After a silicone composition with no catalyst added was allowed to stand at 40° C. for 2 months, the outer appearance was observed. The composition was rated good "○" when the appearance was within the initial range and poor "X" when abnormalities such as separation and sedimentation were found.

TABLE 1

| | Curability | Adhesion | Gloss | Release | Durability | Synthetic resin sheet formation | Shelf stability |
|---|---|---|---|---|---|---|---|
| Example 1 | ○ | ○ | 3 | 3.2 | 3.4 | ○ | ○ |
| Example 2 | ○ | ○ | 2 | 2.0 | 2.1 | ○ | ○ |
| Example 3 | ○ | ○ | 3 | 1.5 | 1.6 | ○ | ○ |
| Comparative Example 1 | ○ | ○ | 30 | 1.1 | 1.0 | X | ○ |
| Comparative Example 2 | Δ | Δ | 3 | 3.9 | 4.1 | ○ | ○ |
| Comparative Example 3 | ○ | ○ | 12 | 2.5 | 2.5 | X | ○ |
| Comparative Example 4 | ○ | ○ | 15 | 3.5 | 3.8 | X | X |
| Comparative Example 5 | ○ | ○ | 8 | 2.9 | 3.0 | X | X |
| Comparative Example 6 | ○ | Δ | 10 | 2.5 | 3.0 | X | X |

The inventive composition forms a coating whose surface gloss is extremely reduced and whose properties are excellent and which thus serves as a release sheet having durability and heat resistance. The composition remains stable during shelf storage and is effective to work. The release sheet has optimum properties for the manufacture of synthetic resin sheets.

BENEFITS OF THE INVENTION

The silicone coating composition of the invention, when applied to a substrate such as paper, laminate paper or plastic film, quickly cures under heat into a cured coating. The cured coating is fully adherent to a variety of substrates, exhibits excellent release properties to synthetic resin sheets to be formed thereon, and is effective for reducing the surface gloss of synthetic resin sheets. The composition has a satisfactory shelf life and pot life, effective workability, and stable properties. As compared with prior art compositions intended for the same application, the inventive composition can be easily adjusted in release property and forms a release sheet best suited for the manufacture of synthetic resin sheets.

Japanese Patent Application No. 2002-216676 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A release sheet comprising a substrate and a cured coating formed on the substrate, wherein the substrate is selected from the group consisting of paper, synthetic resin film and synthetic fiber fabric, and wherein the cured coating is formed from a silicone coating composition consisting essentially of as essential components,
   (A-1) 100 parts by weight of an organopolysiloxane having at least two alkenyl groups each directly attached to a silicon atom in a molecule, represented by the average compositional formula (i):

$$R^1_a R^2_b SiO_{(4-a-b)/2} \qquad (i)$$

wherein $R^1$ is independently a substituted or unsubstituted monovalent hydrocarbon group exclusive of alkenyl groups, $R^2$ is an alkenyl group, a and b are numbers: $0 \leq a \leq 3$, $0 < b \leq 3$ and $1 \leq a+b \leq 3$,
   (B-1) an organohydrogenpolysiloxane having at least three hydrogen atoms each directly attached to a silicon atom (i.e., SiH groups) in a molecule, represented by the average compositional formula (ii):

$$R^1_c H_d SiO_{(4-c-d)/2} \qquad (ii)$$

wherein $R^1$ is as defined above, c and d are numbers: $0 \leq c \leq 3$, $0 < d \leq 3$ and $1 \leq c+d \leq 3$, in such an amount that the moles of silicon-bonded hydrogen atoms is 1 to 5 times the moles of alkenyl groups in component (A-1),
   (C) 5 to 150 parts by weight of a silicone rubber fine powder having an average particle size of 0.5 to 20 μm, and
   (D-1) a catalytic amount of an addition reaction catalyst.

2. The release sheet according to claim 1, wherein the substrate is selected from the group consisting of wood-free paper, clay coated paper, mirror coat paper, polyethylene laminate paper, glassine paper, and kraft paper.

3. A silicone coating composition comprising as essential components,
   (A-2) 100 parts by weight of an organopolysiloxane having at least two silanol groups in a molecule, represented by the average compositional formula (iii):

$$R^1_e(OH)_f SiO_{(4-e-f)/2} \qquad (iii)$$

wherein $R^1$ is independently a substituted or unsubstituted monovalent hydrocarbon group exclusive of alkenyl group, e and f are numbers: $0 \leq e \leq 3$, $0 < f \leq 3$ and $1 \leq e+f \leq 3$,
   (B-2) an organohydrogenpolysiloxane having at least three hydrogen atoms each directly attached to a silicon atom (i.e., SiH groups) in a molecule, represented by the average compositional formula (ii):

$$R^1_c H_d SiO_{(4-c-d)/2} \qquad (ii)$$

wherein $R^1$ is as defined above, c and d are numbers: $0 \leq c \leq 3$, $0 < d \leq 3$ and $1 \leq c+d \leq 3$, in such an amount that the moles of silicon-bonded hydrogen atoms is 5 to 200 times the moles of silanol groups in component (A-2), or an organopolysiloxane having at least three hydrolyzable groups each directly attached to a silicon atom in a molecule, represented by the average compositional formula (iv):

$$R^1_g R^3_h SiO_{(4-g-h)/2} \qquad (iv)$$

wherein $R_1$ is as defined above, $R^3$ is a hydrolyzable group, g and h are numbers: $0 \leq g \leq 3$, $0 < h \leq 3$ and $1 \leq g+h \leq 3$, in such an amount that the moles of hydrolyzable groups is 5 to 200 times the moles of silanol groups in component (A-2),
   (C) 5 to 150 parts by weight of a silicone rubber fine powder having an average particle size of 0.5 to 20 μm, and
   (D-2) a catalytic amount of a condensation reaction catalyst.

4. The silicone coating composition of claim 3 wherein the silicone rubber fine powder (C) has been surface coated with polyorganosilsesquioxane.

5. A release sheet comprising a cured coating of the silicone composition of claim 3.

6. The silicone coating composition of claim 3, which consists essentially of the essential components (A-2), (B-2), (C) and (D-2).

7. A silicone coating composition consisting essentially of as essential components,
   (A-1) 100 parts by weight of an organopolysiloxane having at least two alkenyl groups each directly attached to a silicon atom in a molecule, represented by the average compositional formula (i):

$$R^1_a R^2_b SiO_{(4-a-b)/2} \qquad (i)$$

wherein $R^1$ is independently a substituted or unsubstituted monovalent hydrocarbon group exclusive of alkenyl groups, $R^2$ is an alkenyl group, a and b are numbers: $0 \leq a \leq 3$, $0 < b \leq 3$ and $1 \leq a+b \leq 3$,
   (B-1) an organohydrogenpolysiloxane having at least three hydrogen atoms each directly attached to a silicon atom (i.e., SiH groups) in a molecule, represented by the average compositional formula (ii):

$$R^1_c H_d SiO_{(4-c-d)/2} \qquad (ii)$$

wherein $R^1$ is as defined above, c and d are numbers: $0 \leq c \leq 3$, $0 < d \leq 3$ and $1 \leq c+d \leq 3$, in such an amount that the moles of silicon-bonded hydrogen atoms is 1 to 5 times the moles of alkenyl groups in component (A-1),
   (C) 5 to 150 parts by weight of a silicone rubber fine powder having an average particle size of 0.5 to 20 μm and having been surface coated with polyorganosilsesquioxane, and
   (D-1) a catalytic amount of an addition reaction catalyst.

8. A release sheet comprising a cured coating of the silicone composition of claim 7.

* * * * *